United States Patent
Teraue

(10) Patent No.: US 6,594,402 B2
(45) Date of Patent: Jul. 15, 2003

(54) IMAGE DATA OUTPUT APPARATUS AND IMAGE DATA OUTPUT PROGRAM STORAGE MEDIUM

(75) Inventor: Eiji Teraue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 327 days.

(21) Appl. No.: 09/791,716

(22) Filed: Feb. 26, 2001

(65) Prior Publication Data

US 2001/0017621 A1 Aug. 30, 2001

(30) Foreign Application Priority Data

Feb. 29, 2000 (JP) .......................................... 2000-053850

(51) Int. Cl.$^7$ ................................................. G06K 9/36
(52) U.S. Cl. .................... 382/276; 342/191; 348/218.1; 355/127; 382/173
(58) Field of Search ................................ 382/100, 164, 382/173, 112, 113, 175, 179–180, 305, 171, 294, 293, 298, 276; 101/130, 368; 342/191, 175; 384/218.1; 355/18

(56) References Cited

U.S. PATENT DOCUMENTS

| | | | | | |
|---|---|---|---|---|---|
| 4,899,293 | A | * | 2/1990 | Dawson et al. | 345/423 |
| 5,109,348 | A | * | 4/1992 | Pfeiffer et al. | 345/505 |
| 5,189,529 | A | * | 2/1993 | Ishiwata et al. | 358/451 |
| 5,457,515 | A | * | 10/1995 | Quadracci et al. | 355/132 |
| 5,515,481 | A | * | 5/1996 | Pardo | 358/1.18 |

* cited by examiner

*Primary Examiner*—Jayanti K. Patel
(74) *Attorney, Agent, or Firm*—Sughrue Mion, PLLC

(57) ABSTRACT

In an image data output apparatus for outputting image data representative of a single image through a conversion into image data representative of partial images each to be recorded, when the single image is outputted on a divisional basis into a plurality of sheets, on the associated sheet, a maximum number of sheets used in an output of a single image is designated in accordance with an operation, and it is inhibited that the single image is divided into a number of segment sheets of images more than the maximum number of sheets.

4 Claims, 5 Drawing Sheets

IMAGE DATA OUTPUT APPARATUS AND IMAGE DATA OUTPUT PROGRAM STORAGE MEDIUM

BACKGROUND OF THE INVENTION

1. Field of the Invention

The present invention relates to an image data output apparatus for outputting image data representative of a single image through a conversion into image data representative of partial images each to be recorded, when the single image is outputted on a divisional basis into a plurality of sheets, on the associated sheet, and an image data output program storage medium storing an image data output program which causes a computer to operate as such an image data output apparatus when the image data output program is executed in the computer.

2. Description of the Related Art

Hitherto, it is performed that image data is taken into an image processing apparatus, which is realized using a personal computer and the like, so that an edition of an image is carried out on the image data, or a color correction is carried out, and image data subjected to the edition and the color correction is outputted to an image output apparatus such as a color printer so that the image output apparatus outputs a desired image.

When it is intended that an image output apparatus is used to output an image, it happens that a size of the edited image is too large to record the image in its entirety on a sheet of paper. In order to cope with such a situation, it happens that the image output apparatus side performs a so-called tiling output that image data of a single image is converted into image data representative of partial images to be recorded on segment papers when the single image is outputted on a divisional basis into a plurality of sheets of paper (for example, two sheets, four sheets, six sheets, etc.) according to a size of the image, and the plurality of sheets of paper, on which the partial images are recorded, are combined to form a sheet of image.

Hitherto, in the event that the tiling is performed, there is provided such an arrangement that a divisional number of sheets is automatically determined in view of a size of image, and image data representative of partial images the number of which is the same as the divisional number of sheets are sequentially continuously outputted to the image output apparatus. This arrangement is involved in a possibility that a single image is unnecessarily divided into a number of sheets of images. For example, in the event that the main portion of the image, which is the subject matter of the image, exists at the central portion of the image, and the peripheral portions of the image are simply the background elements, even if it encounters such a situation that the use of only two sheets brings about lack of a little portion of the peripheral portion of the image, the image is divided into four sheets of images in order to avoid such a lack.

SUMMARY OF THE INVENTION

In view of the foregoing, it is an object of the present invention to provide an image data output apparatus capable of performing the tiling output preventing the image from being unnecessarily divided into a number of sheets of images, and an image data output program storage medium storing an image data output program which causes a computer to operate as such an image data output apparatus when the image data output program is executed in the computer.

To achieve the above-mentioned object, the present invention provides an image data output apparatus for outputting image data representative of a single image through a conversion into image data representative of partial images each to be recorded, when the single image is outputted on a divisional basis into a plurality of sheets, on the associated sheet, said image data output apparatus comprising:

a maximum number of sheets designation section for designating in accordance with an operation a maximum number of sheets used in an output of a single image when the image is outputted on a divisional basis that the image is divided into a plurality of segment sheets;

a data conversion section for converting the image data representative of the single image into image data representative of divisional images of number within the maximum number of sheets designated by said maximum number of sheets designation section; and a data output section for outputting the image data after conversion by said data conversion section.

In the image data output apparatus according to the present invention as mentioned above, it is preferable that said data conversion section converts even image data representative of an image of a size involved in an overflow portion when a same number of segment sheets as the maximum number of sheets designated by said maximum number of sheets designation section are prepared, permitting an overflow from the segment sheets, into image data representative of divisional images of a number of which is identical with the maximum number of sheets.

To achieve above-mentioned object, the present invention provides an image data output program storage medium storing an image data output program which causes a computer to operate as an image data output apparatus for outputting image data representative of a single image through a conversion into image data representative of partial images each to be recorded, when the single image is outputted on a divisional basis into a plurality of sheets, on the associated sheet, when the image data output program is executed in the computer, wherein said image data output program storage medium stores the image data output program comprising:

a maximum number of sheets designation section for designating in accordance with an operation a maximum number of sheets used in an output of a single image when the image is outputted on a divisional basis that the image is divided into a plurality of segment sheets;

a data conversion section for converting the image data representative of the single image into image data representative of divisional images of number within the maximum number of sheets designated by said maximum number of sheets designation section; and a data output section for outputting the image data after conversion by said data conversion section.

In the image data output program storage medium according to the present invention as mentioned above, it is preferable that said data conversion section converts even image data representative of an image of a size involved in an overflow portion when a same number of segment sheets as the maximum number of sheets designated by said maximum number of sheets designation section are prepared, permitting an overflow from the segment sheets, into image data representative of divisional images of a number of which is identical with the maximum number of sheets.

According to the present invention, to perform the tiling output, a maximum number of sheets used in an output of a single image is designated in accordance with an operation, and it is inhibited that the single image is divided into a number of segment sheets of images more than the maximum number of sheets. This feature makes it possible to prevent the image from being unnecessarily divided into a number of sheets of images.

DETAILED DESCRIPTION OF PREFERRED EMBODIMENTS

Embodiments of the present invention will be described with reference to the accompanying drawings.

Figure 1:
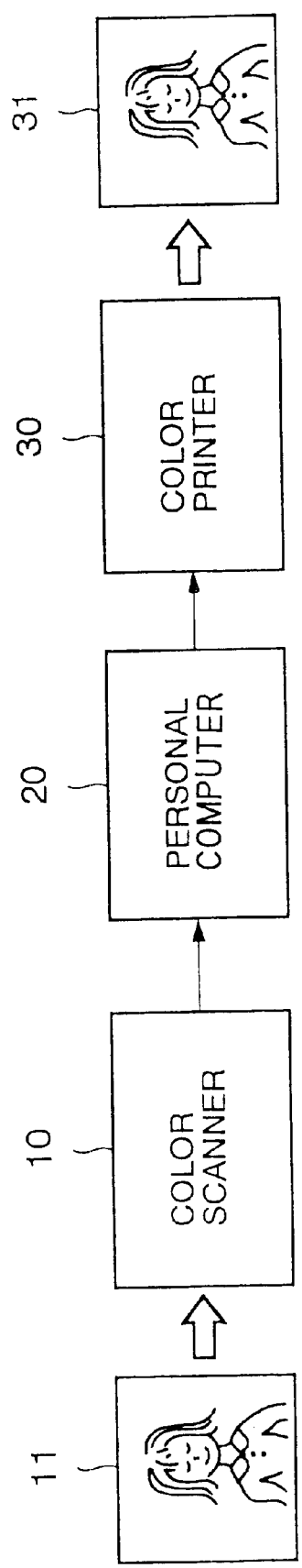
FIG. 1 is a schematic constitution view of an image input-color conversion-image output system to which an embodiment of the present invention is applied.

FIG. 1 is a schematic constitution view of an image input-color conversion-image output system to which an embodiment of the present invention is applied.

A color scanner 10 reads an original image 11 and produces image data of three colors consisting of C (cyan), M (magenta), and Y (yellow). The image data of the CMY three colors is fed to a personal computer 20. The personal computer 20 converts the image data obtained by the color scanner 10 into image data for an image output suitable for a color printer 30 which will be described later. The image data for the image output is fed to the color printer 30. The color printer 30 performs a print output in accordance with the entered image data so that a print image 31 is formed.

In the system shown in FIG. 1, while the color printer 30 is shown as an example of an output device for outputting an image based on the image data, any one is acceptable, as the output device, which is a color printer according to an electrophotographic scheme, a color printer according to an ink jet scheme, or a printer according to a system in which a printing paper is exposed with a modulated laser beam and the exposed printing paper is developed, and it doesn't matter as to the printing scheme and the printing system. Further, as the image output device, it is not restricted to a printer, and any one is acceptable which is a printing machine, or alternatively an image display device such as a CRT display unit for displaying an image on a display screen, and a plasma display unit.

Here, however, there will be described a system having the color printer 30 by way of example of the output device.

An aspect as an embodiment of the present invention in the system shown in FIG. 1 resides in processing contents to be executed inside the personal computer 20. Hereinafter, there will be described the personal computer 20.

Figure 2:
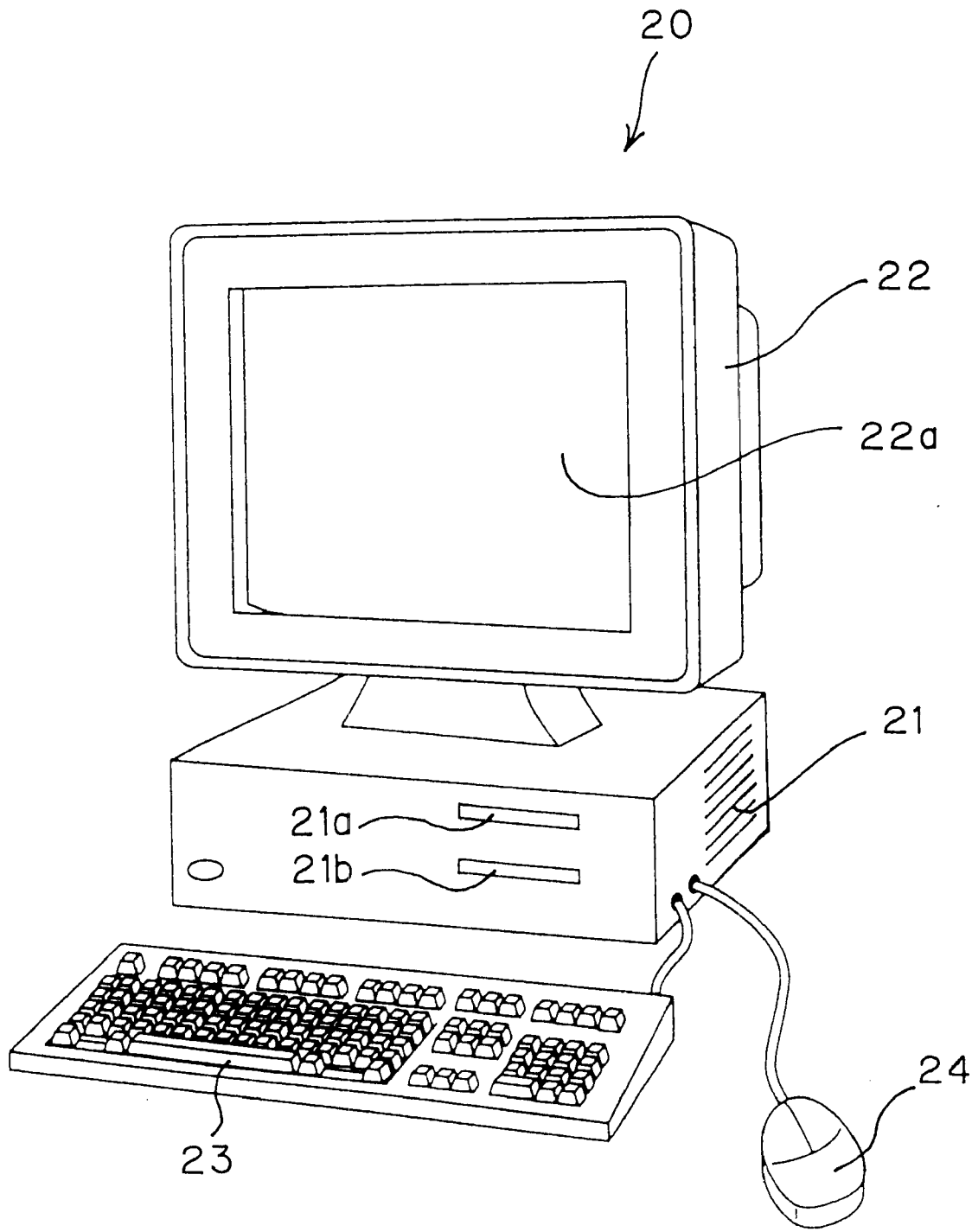
FIG. 2 is a perspective view of a personal computer shown in FIG. 1.
Figure 3:
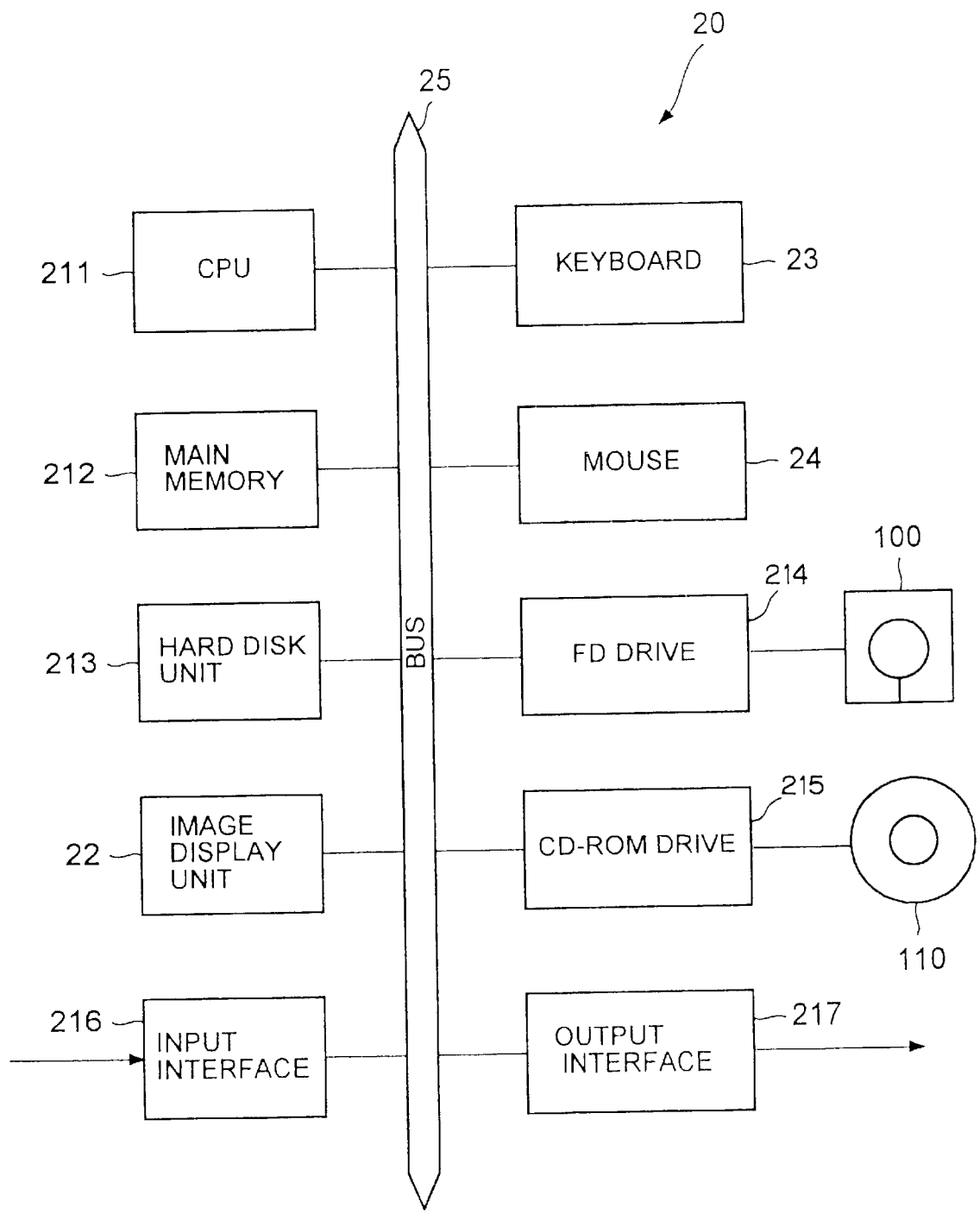
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the color scanner 10 (cf. FIG. 1), to receive image data from the color scanner 10, and an output interface 217 to transmit image data to the color printer 30. These various types of elements are connected via a bus 25 to the image display unit 22, the keyboard 23 and the mouse 24.

The CD-ROM 110 stores therein an image data output program for causing the personal computer 20 to operate as an image data output apparatus. The CD-ROM 110 is mounted on the CD-ROM drive 215 so that the program, which is stored in the CD-ROM 110, is up-loaded on the personal computer 20 and is stored in the hard disk unit 213.

Figure 4:
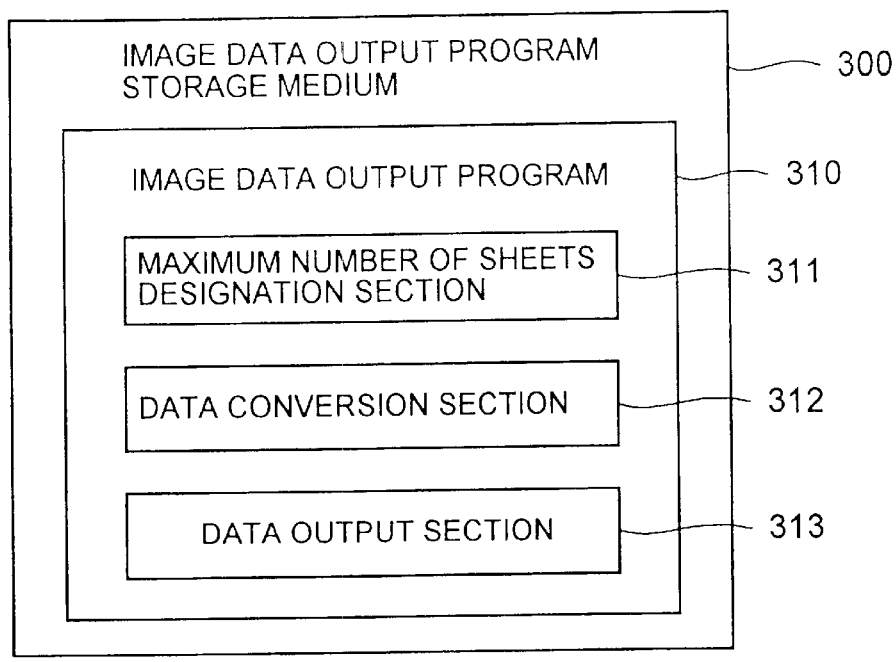
FIG. 4 is a view showing an embodiment of an image data output program storage medium of the present invention.

FIG. 4 is a view showing an embodiment of an image data output program storage medium of the present invention. This image data output program storage medium is typical of the storage medium of the CD-ROM 110 and hard disks in the hard disk unit 213 shown in FIG. 3.

An image data output program storage medium 300 stores therein an image data output program 310 having a maximum number of sheets designation section 311, a data conversion section 312, and a data output section 313. Contents of the maximum number of sheets designation section 311, the data conversion section 312, and the data output section 313 will be described later.

Figure 5:
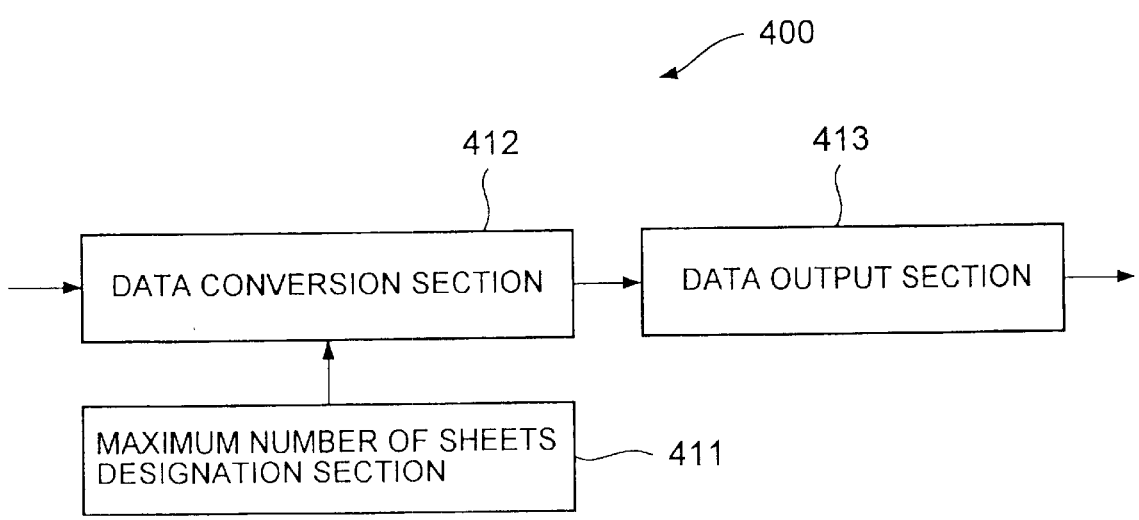
FIG. 5 is a functional block diagram showing an embodiment of an image data output apparatus of the present invention.

FIG. 5 is a functional block diagram showing an embodiment of an image data output apparatus of the present invention.

An image data output apparatus 400 is implemented in such a way that the image data output program 310 stored in the image data output program storage medium 300 shown in FIG. 4 is loaded on the personal computer 20 shown in FIGS. 1 to 3, and the image data output program 310 is executed in the personal computer 20.

The image data output apparatus 400 comprises a maximum number of sheets designation section 411, a data conversion section 412 and a data output section 413. The maximum number of sheets designation section 411, the data conversion section 412 and the data output section 413 are constructed by combinations of the maximum number of sheets designation section 311, the data conversion section 312, and the data output section 313 as the soft ware parts shown in FIG. 4, and the hard wares of the personal computer 20 and OS (operation system), which are necessary for implementing the functions of those soft ware parts, respectively.

Hereinafter, there will be described the present embodiment.

The maximum number of sheets designation section 411 designates a maximum number of sheets used in an output of a single image when the image is outputted onto a plurality of segment sheets (when a so-called tiling output is performed), in accordance with an operator's operation of the keyboard 23 or the mouse 24 of the personal computer 20 shown in FIG. 2.

The data conversion section 412 converts, when the tiling output is performed, image data representative of a single image intended to be outputted into image data representative of divisional images of the number within the maximum number of sheets designated by the maximum number of sheets designation section 411.

According to the present embodiment, even in the event that a division of an single image intended to be outputted into the maximum number of segment sheets designated by the maximum number of sheets designation section 411 is insufficient to cover the complete image, the single is divided into the same number as the maximum number of sheets.

The data output section 413 outputs image data after the conversion by the data conversion section 412.

Figure 6:
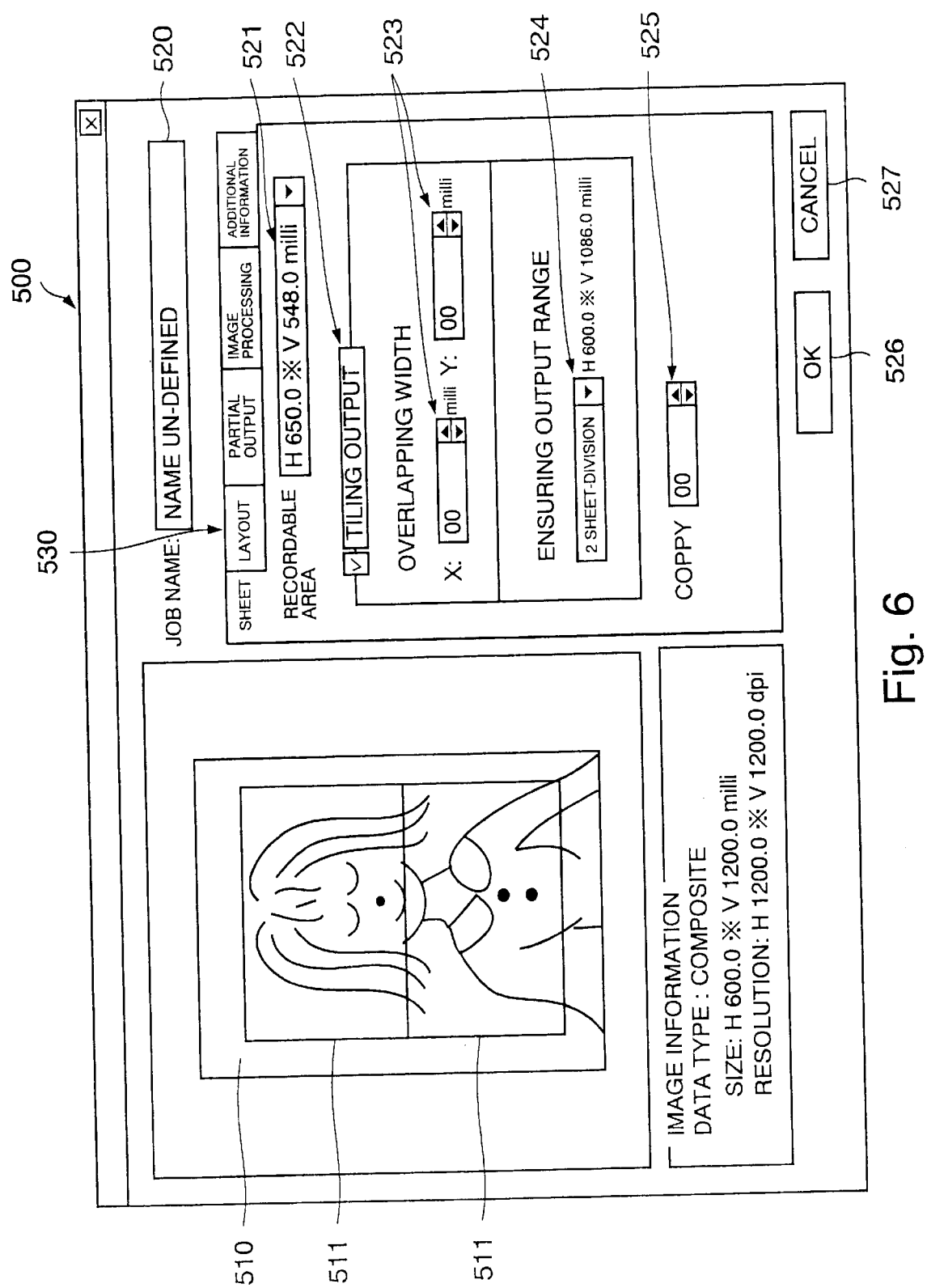
FIG. 6 is a view of a maximum number of sheets designation screen.

FIG. 6 is a view of a maximum number of sheets designation screen which is displayed on the display screen 22a of the image display unit 22 of the personal computer 20 shown in FIG. 2.

On the left hand of the maximum number of sheets designation screen 500, there are displayed an image intended to be outputted within an image display area 510, and in addition frames 511 for segment sheets being superposed on the image. According to the present embodiment, the image is outputted on a divisional basis into two segment sheets, and the periphery of the image is out of the two segment sheets.

On the lower left of the maximum number of sheets designation screen 500, there is displayed information involved in an image to be outputted.

On the right hand of the maximum number of sheets designation screen 500, there are provided a name entry column 520 for entering a name of a job involved in image output, a selection column 521 for selecting a size available in image recording per a sheet, a set up column 522 for setting up as to whether the tiling output is selected, a designation column 523 for designating a size of an overlapping width of sheets in case of the selection of the tiling output, a set up column 524 for setting up the maximum divisional number in case of the selection of the tiling output (in FIG. 6, two sheets is set up as the maximum divisional number), and a set up column 525 for setting up the number of output sheets of image. When those items are set up through the mouse operation, or utilizing ones already set up, and then an OK button 526 is clicked, image data is outputted. According to the embodiment shown in FIG. 6, an image excepting the peripheral portion of the single image is outputted on a divisional basis into two sheets.

A cancel button 522 is a button for closing the maximum number of sheets designation screen 500.

Incidentally, according to the present embodiment, it is possible to control a relative positional relation between an image and a sheet in such a manner that a screen "layout" 530 is displayed to be operated thereon. The utility of this function makes it possible to output an image that the main part of the image is located at the relatively edge portion of the image, through an adjustment of the position of the image in such a manner that the main part appears on the sheet without lack of the main part.

As mentioned above, according to the present invention, there is no possibility that an image is outputted on a divisional basis that the image is unnecessarily divided into a number of segment sheets, and thereby omitting the useless in the event that a single image is outputted on a divisional basis that the image is divided into a plurality of segment sheets.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data output apparatus for outputting image data representative of a single image through a conversion into image data representative of partial images each to be recorded, when the single image is outputted on a divisional basis into a plurality of sheets, on the associated sheet, said image data output apparatus comprising:

a maximum number of sheets designation section for designating in accordance with an operation a maximum number of sheets used in an output of a single image when the image is outputted on a divisional basis that the image is divided into a plurality of segment sheets;

a data conversion section for converting the image data representative of the single image into image data representative of divisional images of number within the maximum number of sheets designated by said maximum number of sheets designation section; and a data output section for outputting the image data after conversion by said data conversion section.

2. An image data output apparatus according to claim 1, wherein said data conversion section converts even image data representative of an image of a size involved in an overflow portion when a same number of segment sheets as the maximum number of sheets designated by said maximum number of sheets designation section are prepared, permitting an overflow from the segment sheets, into image data representative of divisional images of a number of which is identical with the maximum number of sheets.

3. An image data output program storage medium storing an image data output program which causes a computer to operate as an image data output apparatus for outputting image data representative of a single image through a conversion into image data representative of partial images each to be recorded, when the single image is outputted on a divisional basis into a plurality of sheets, on the associated sheet, when the image data output program is executed in the computer, wherein said image data output program storage medium stores the image data output program comprising:

a maximum number of sheets designation section for designating in accordance with an operation a maximum number of sheets used in an output of a single image when the image is outputted on a divisional basis that the image is divided into a plurality of segment sheets;

a data conversion section for converting the image data representative of the single image into image data representative of divisional images of number within the maximum number of sheets designated by said maximum number of sheets designation section; and a data output section for outputting the image data after conversion by said data conversion section.

4. An image data output program storage medium according to claim 3, wherein said data conversion section converts even image data representative of an image of a size involved in an overflow portion when a same number of segment sheets as the maximum number of sheets designated by said maximum number of sheets designation section are prepared, permitting an overflow from the segment sheets, into image data representative of divisional images of a number of which is identical with the maximum number of sheets.

* * * * *